C. ERICKSON.
WAGON SHAFT.
APPLICATION FILED JAN. 30, 1909.
921,528.
Patented May 11, 1909.
2 SHEETS—SHEET 1.
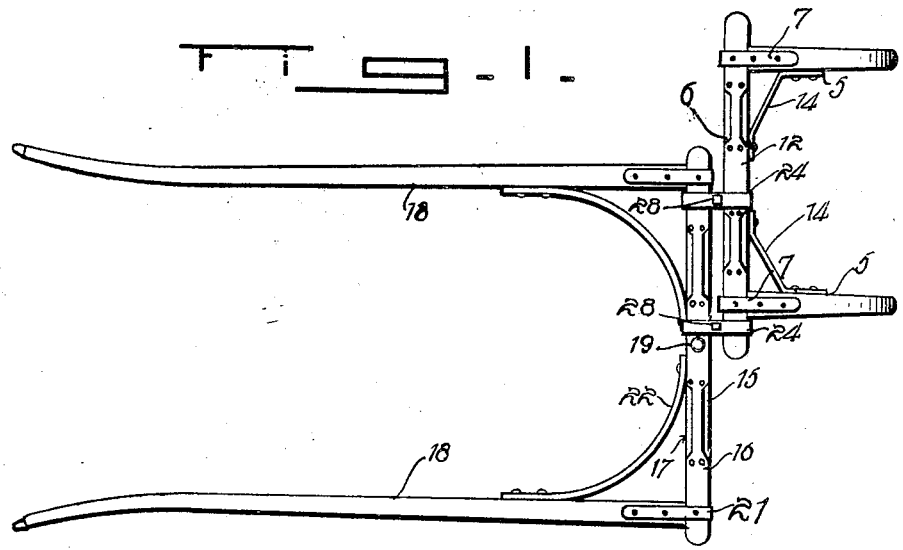
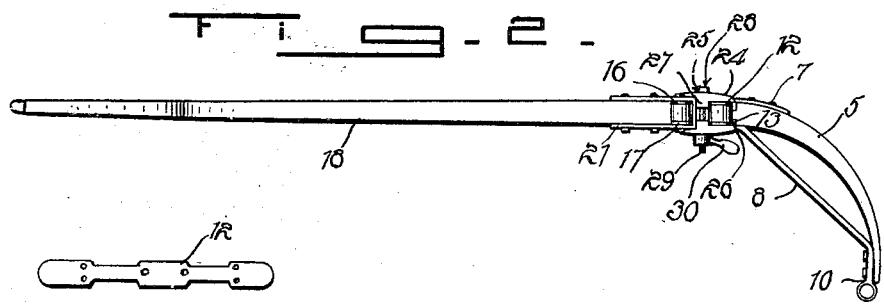
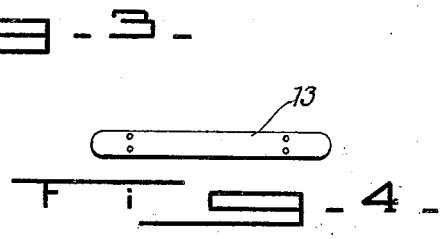
Inventor
CHRISTIAN ERICKSON.
Witnesses
C. E. Chandler.
E. L. Chandler.
By Woodward Chandler
Attorneys

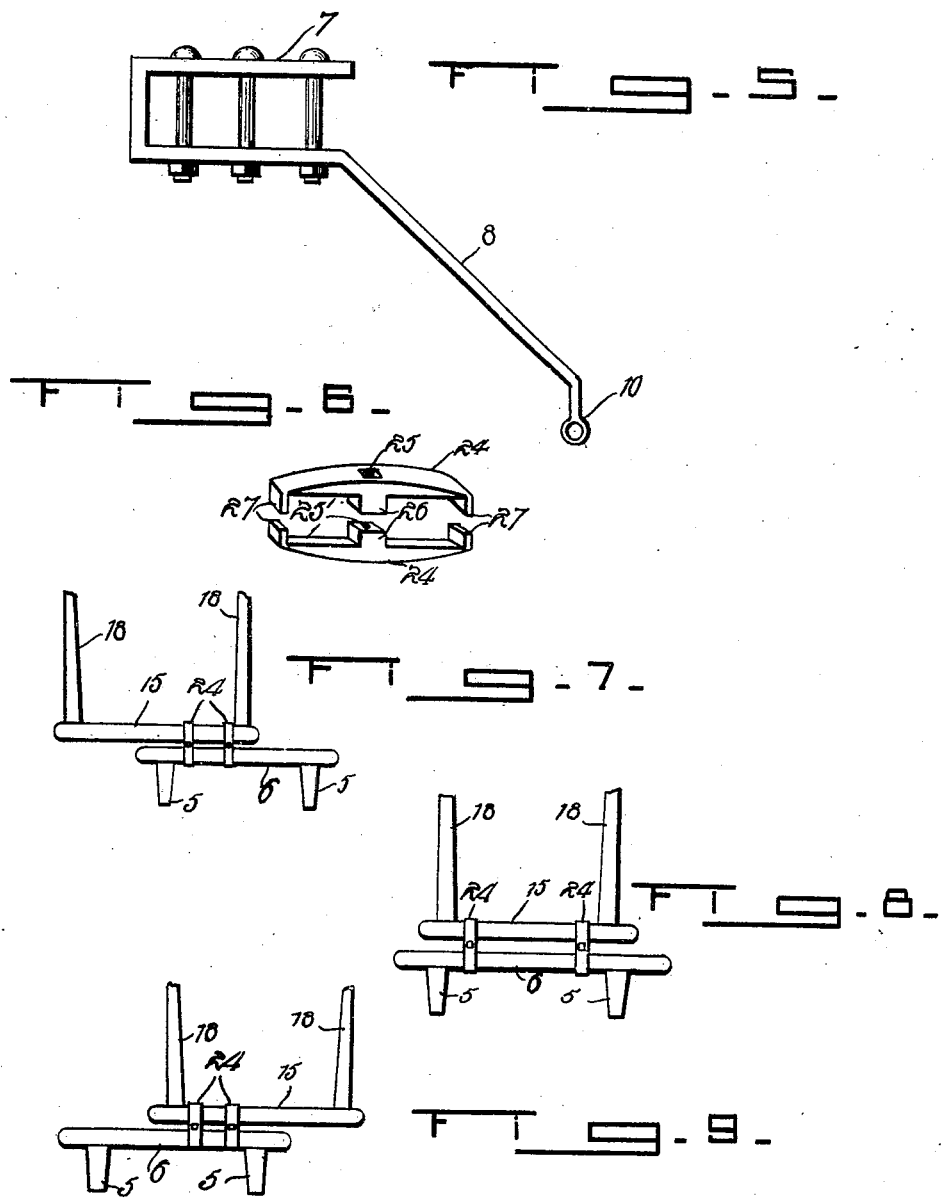

UNITED STATES PATENT OFFICE.

CHRISTIAN ERICKSON, OF TOWER CITY, NORTH DAKOTA.

WAGON-SHAFT.

No. 921,528.     Specification of Letters Patent.     Patented May 11, 1909.

Application filed January 30, 1909. Serial No. 475,143.

*To all whom it may concern:*

Be it known that I, CHRISTIAN ERICKSON, a citizen of the United States, residing at Tower City, in the county of Cass and State of North Dakota, have invented certain new and useful Improvements in Wagon-Shafts, of which the following is a specification.

This invention relates to certain new and useful improvements in vehicle thills.

The object of my invention is to provide a thill to be used with a single horse rig arranged so that the thill may be shifted to bring the draft animal in the wheel rut either upon the right or left, or the animal may be secured centrally between the wheel ruts.

With this and other objects in view the present invention consists in the combination and arrangement of parts, as will be hereinafter more fully described, and particularly pointed out in the claim, and it will be understood that changes in the specific structure shown and described may be made within the scope of the claim without departing from the spirit of the invention.

In the drawings forming a portion of this specification, and in which like numerals of reference indicate similar parts in the several views, Figure 1 discloses a top view of a thill constructed according to my invention, Fig. 2 is a side view of the same, Fig. 3 is a plan view of one of the upper face plates, Fig. 4 is a plan view of the lower face plate, Fig. 5 is a side view of one of the brace rods and connected clips, Fig. 6 is a perspective view of one of the adjusting clamps, Figs. 7, 8 and 9 disclose the intermediate and extreme side positions of the thills.

The aim of my invention is, to provide a thill so arranged that same may be shifted from side to side relative to the front axle, so as to provide a safe and convenient footing for the draft animal as well as to insure an easy trail and riding of the vehicle. This I accomplish in that I connect the thills to the front axle in such a way that the vehicle will trail in the wheel ruts if that is desirable, or the draft animal may be given a path within one of the ruts, the wheels running between the ruts.

In the accompanying drawings 5, 5, represents two stub thills which at their outer ends are connected by means of the transverse carrier bar 6. The carrier bar 6 is secured to the stub thills by means of the clip 7 which clip below is continued in the coupling rod 8 fastened to the lower ends of the stub thills and terminates in the thill coupling 10 as disclosed. This carrier bar 6 is reinforced above by means of the face plate 12 and below by means of the face plate 13. These plates are secured by means of suitable screws. The carrier bar 6 is further secured to the thills by means of the corner braces 14 disclosed in the top view.

The thills 18 as used in my invention are secured to an adjustably held cross bar 15 the upper and lower faces of which are reinforced by means of the face plates 16 and 17, these face plates being perforated in order to receive the pin 19 carrying the swingletree. At their ends, the shafts 18 are secured to this cross bar 15 by means of the clip 21, and the corner brace rods 22 as disclosed in the top view.

In order to adjustably secure the cross bar 15 to the carrier bar 6, I employ two clamps, each clamp comprising two similar members 24 each having central screw openings 25 and 25' the centrally positioned lugs 26 and the terminal clip 27 as clearly disclosed in the drawings. The screw or bolt opening 25 within the upper clamp member at its outer end is squared to receive the square upper end 28 of the adjusting bolt 29 which below is provided with the lever nut 30. By means of these clamps and the connected bolt, the members 6 and 15 are held in adjustable spaced relation.

As disclosed in Fig. 1 the carrier bar 6 extends beyond the side of the stub thills 5, so that when the clamps are secured one of them will be placed upon the outside and adjacent to the clip 7. By this means the thill-carrying cross bar 15 is adjustably secured to the carrier bar 6 so that the thills may be given any desired position relative to the wheel ruts. By this arrangement the animal may be so positioned as to travel squarely within the right wheel rut as will be understood referring to Fig. 9, or the shafts or thills may be adjusted so that the draft animal will travel squarely between the wheel ruts.

The bars 6 and 15, are of equal length, width, and thickness, and the terminal lips 27 of the clamps are held parallel to the lugs 26.

The device is light, neat, simple of construction and readily operated.

Having thus described my said invention, what I claim as new and desire to secure by United States Letters Patent is:

The combination with two stub thills, of a carrier bar transversely secured to said thills at their ends, the ends of said carrier bar projecting beyond said thills, two thills, a cross bar of a length, width and thickness equal to said carrier bar connecting said thills at their rear ends, two clamps, each clamp comprising two similar members, each member having a centrally positioned spacing lug, each lug having a bolt opening, each clamp having two terminal lips held parallel to said lugs, the distance between each lug and lip being equal to the width of said bars, and bolts passing through said openings within said lugs so that said clamps may be fastened to said bars to hold them in parallel spaced relation, in the manner disclosed.

In testimony whereof I affix my signature, in presence of two witnesses.

CHRISTIAN ERICKSON.

Witnesses:
FENNO B. KEFF,
G. C. WARD.